Nov. 1, 1966
H. R. KARLEN
3,282,468
HOT WATER SUPPLY APPARATUS
Filed Dec. 6, 1963
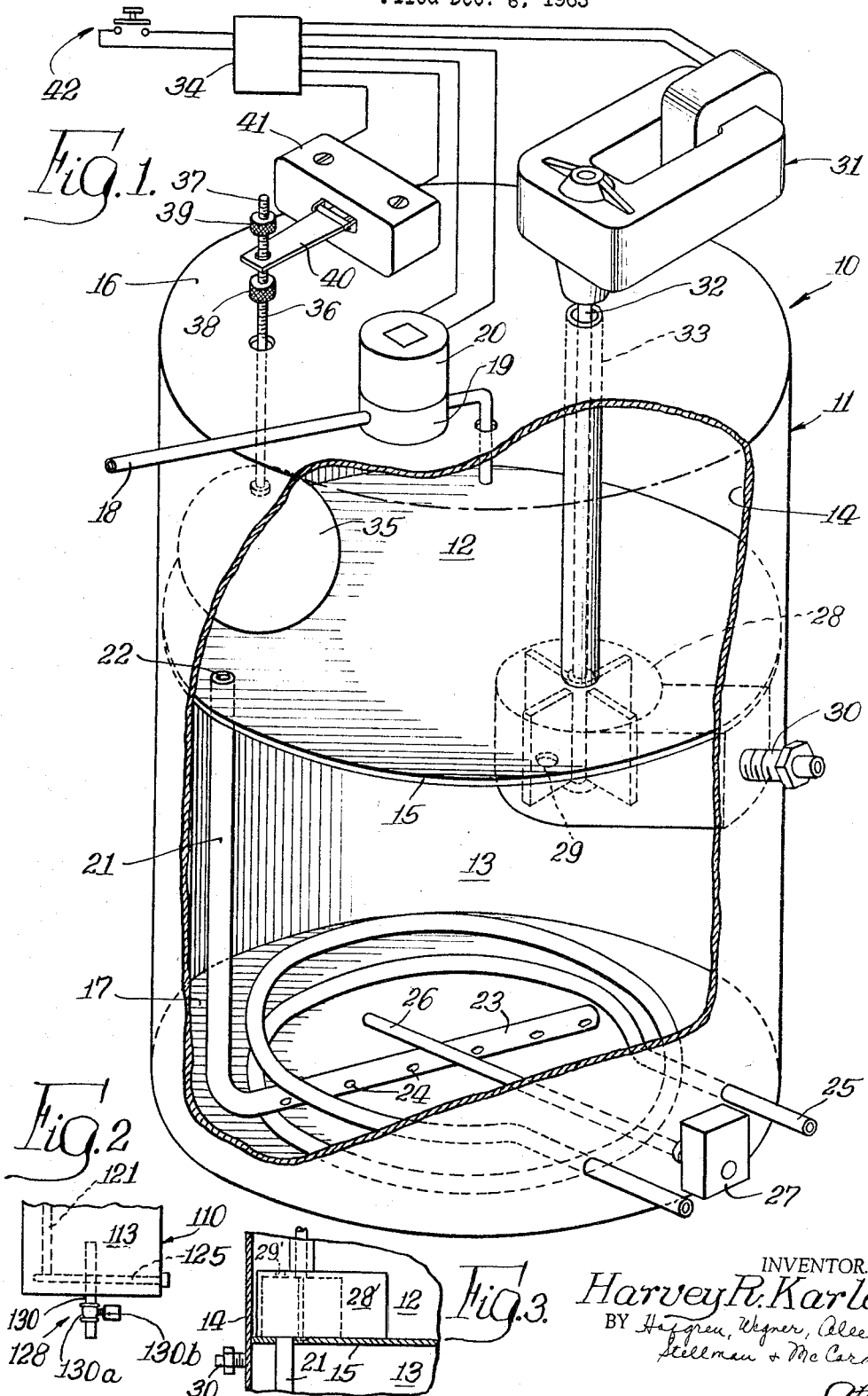
INVENTOR.
Harvey R. Karlen,
BY Haggren, Wegner, Allen,
Stellman & McCord
Attys.

United States Patent Office 3,282,468
Patented Nov. 1, 1966

3,282,468
HOT WATER SUPPLY APPARATUS
Harvey R. Karlen, Chicago, Ill., assignor to Cory Corporation, a corporation of Delaware
Filed Dec. 6, 1963, Ser. No. 328,540
11 Claims. (Cl. 222—67)

This invention relates to apparatus for supplying hot water and in particular to apparatus for supplying preselected quantities of hot water.

In brewing apparatuses such as coffee brewing apparatuses, a supply of hot water is provided to the brewing chamber wherein a preselected quantity of the beverage is brewed. Different structures are provided in the different apparatuses for providing the preselected quantity of hot water for this purpose. The present invention comprehends an improved hot water supply apparatus which is adapted to provide accurate quantities of hot water with minimum down time for heating of the water.

Thus, a principal object of the present invention is the provision of a new and improved hot water supply apparatus.

Another object of the invention is the provision of such a hot water supply apparatus including a measuring chamber and a heating chamber with means for transferring hot water from the heating chamber and concurrently transferring cold water from the measuring chamber to the heating chamber so that the heating of water in the heating chamber may be effected at all times including during the delivery of hot water from the apparatus.

A further object of the invention is the provision of such a hot water supply apparatus wherein the volume of the hot water delivered is controlled by means responsive to the level of the water in the measuring chamber.

Still another object of the invention is the provision of such a hot water supply apparatus wherein the heating means is arranged to provide heat energy at a rate sufficient to raise the temperature of the water in the heating chamber to the desired brewing temperature within a total period of time no greater than the time of delivery of the hot water from the heating chamber, plus the time of delivery of replenishment cold water in the measuring chamber subsequent to the delivery of the hot water from the heating chamber.

Still another object of the invention is the provision of such a hot water supply apparatus wherein the measuring and heating chambers are connected by thermally conductive means providing a preheating of the cold water in the measuring chamber for expediting the reaching of the preselected brewing temperature upon delivery of the cold water to the heating chamber.

A further object of the invention is the provision of such a hot water supply apparatus including means defining a first chamber, means defining a second chamber, passage means communicating with the chambers for conducting liquid seriatim to the first and second chamber, means for heating liquid in one of the chambers, means for sensing the level of liquid in the other of the chambers, and means responsive to the level sensing means to effect a delivery of liquid from the second chamber, to terminate the delivery of the liquid from the second chamber when the liquid level sensed by the sensing means reaches a preselected low level and initiate a delivery of liquid through the passage means into the first chamber, and to terminate the delivery of liquid to the first chamber when the level sensed by the sensing means reaches a preselected high level.

A still further object of the invention is the provision of such a hot water supply apparatus including means defining a measuring chamber, means defining a heating chamber, means for delivering cold brewing liquid to the measuring chamber, means for transferring liquid from the heating chamber to a preselected discharge point and concurrently transferring cold liquid from the measuring chamber to the heating chamber, means for heating liquid in the heating chamber, means for selectively initiating operation of the transferring means, means responsive to the level of the liquid in the measuring chamber for terminating operation of the transferring means when a preselected quantity of liquid has been transferred by the transferring means and subsequently causing the third named means to deliver a quantity of cold brewing liquid to the measuring chamber equal to that transferred.

Other objects and advantages of the invention will be apparent from the following description taken in connection with the accompanying drawing wherein:

FIGURE 1 is an isometric view of a hot water supply apparatus embodying the invention with a portion thereof broken away for facilitating illustration thereof;

FIGURE 2 is a fragmentary elevation of a modified form of hot water supply apparatus embodying the invention; and FIGURE 3 is a fragmentary vertical section of a further modified form of hot water supply apparatus embodying the invention.

In the exemplary embodiment of the invention as disclosed in FIGURE 1 of the drawing, a hot water supply apparatus generally designated 10 is shown to comprise a tank 11 defining a first, measuring chamber 12, and a second, heating chamber 13, disposed below the level of the chamber 12. While the chambers may be spaced from each other within the broad scope of the invention, in the illustrated embodiment, the chambers 12 and 13 are defined by a common cylindrical wall 14 and a transverse wall 15 with a top wall 16 defining the top of chamber 12 and a bottom wall 17 defining the bottom of chamber 13.

Cold water is delivered to the measuring chamber 12 from a supply line 18 provided with a valve 19 controlled by a conventional solenoid 20. The supply line 18 may be connected to a suitable source of cold water under pressure (not shown). The cold water flows from the measuring chamber 12 through an outlet tube 21 having an inlet 22 extending through the transverse wall 15 and opening into the lower portion of the heating chamber 13. The lower end 23 of tube 21 is turned to extend horizontally over the bottom wall 17 of chamber 13 and is provided with a plurality of discharge openings 24 for delivering the water into the lower portion of chamber 13 in a plurality of small streams to effectively minimize mixing of the incoming water with the water already in the chamber 13. The water in chamber 13 is heated by suitable conventional heating means such as an electrical heater 25. The temperature of the hot water in the chamber 13 is sensed by a thermostatic probe 26 extending into the lower portion of the chamber 13 through the tank wall 14 adjacent the bottom wall 17. The probe is provided at its end exteriorly of the tank 11 with a conventional control switch element 27 for providing an electrical circuit control responsive to the temperature of the water in the tank chamber 13.

Hot water is delivered from heating chamber 13 by means of a fluid impeller, herein a vane pump 28, having an inlet 29 communicating with the chamber 13 and an outlet 30 for delivering the hot water under pressure to a suitable delivery point as desired. Illustratively, the outlet 30 may lead to a conventional coffee brewing cartridge structure (not shown) wherein the hot water is used a brew a quantity of coffee. As the pump 28 provides a pressure discharge, the cartridge may be located as desired above or below the level of the hot water tank 11 and adjacent to or remote from the tank as desired.

In the illustrated embodiment pump 28 is driven by a conventional electric motor 31 through a drive shaft 32 extending coaxially downwardly through chamber 12 within a tubular housing 33 sealingly joined at its opposite ends to the top wall 16 and the transverse wall 15.

Control of the apparatus 10 is effected by a suitable control generally designated 34 arranged to energize the electric motor 31 to operate pump 28 when hot water is desired by the user. For this purpose a manually operable push-button switch 42 is provided which is suitably electrically connected to the control 34. As the hot water is delivered through the outlet 30 by the pump 28, an equal amount of cold water passes from chamber 12 downwardly through tube 21 into the lower portion of chamber 13 where it is heated by the heater 25. The solenoid valve 19 is closed at this time, and thus this flow of water from the measuring chamber causes the level of cold water in chamber 12 to drop. The water level in measuring chamber 12 is sensed by a float 35 carrying an upstanding rod 36 provided with a threaded upper end 37 having a lower adjustable stop 38 and an upper adjustable stop 39 carried thereon. The stops 38 and 39 selectively engage an operating finger 40 of a conventional double throw snap action toggle switch 41, as a function of the vertical positioning of the float 35. More specifically, when the water level decreases and the float moves downwardly to a preselected lowermost "EMPTY" position wherein the stop 39 depresses the switch finger 40, the switch actuates control 34 to terminate operation of motor 31 and discontinue delivery of hot water from chamber 13. At the same time, control 34 is actuated to energize solenoid coil 20 to open valve 19 and cause a delivery of cold water from supply line 18 into measuring chamber 12. The delivery of cold water continues until the water level, and thus float 35, rises to a preselected upper "FULL" position wherein the lower stop 38 on rod 36 engages and snaps the finger 40 upwardly to reverse the switch 41 and thereby actuate control 34 to de-energize solenoid 20 and re-establish the control for subsequent operation by the user to cause delivery of hot water from the tank as desired.

Thus, the apparatus 10 automatically provides a preselected quantity of hot water once each time the control 34 is actuated as discussed above. This quantity of hot water is determined by the adjustable setting of the stops 38 and 39 on the float rod 36 so that the user, by suitable adjustment of the stops, may obtain any one of a plurality of accurately controlled preselected quantities of hot water.

The heat transfer rate of the electric heating element 25 is preferably made at least sufficient to heat the water added to heating chamber 13 from chamber 12 to the desired discharge temperature during a total time interval no greater than the time during which hot water is delivered from the tank, plus the time during which the cold water is being delivered into the measuring chamber 12. Thus, as soon as the measuring chamber 12 has been refilled, a subsequent delivery of the preselected quantity of hot water from the tank may be effected. Obviously, the effective volume of the heating chamber 13 is determined by the stops 38 and 39 as these control the volume of water in measuring chamber 12 which is withdrawn during each cycle and this volume is equal to that of the hot water delivered from the outlet 30.

The thermostat control 26, 27 may be suitably arranged to control the heating element 25 so as to preclude overheating of the water in heating chamber 13 while causing suitable energization of the heating element 25 to heat the water throughout the heating chamber 13 to the desired outlet temperature. The control 27 may be of suitable conventional construction, such controls being conventional in the art and requiring no further description herein.

Alternatively, as shown in FIGURE 3, the pump 28' may be disposed within measuring chamber 12 with the inlet 29' opening to the chamber 12 and the pump being arranged to discharge into tube 21 so as to pump the cold water from the chamber 12 through the tube 21 into the chamber 13 and thereby force out an equal volume of hot water through the outlet 30. The operation of the apparatus is as discussed above as the float 35 functions in a similar manner whether the pumping means is at the inlet or the outlet of the chamber portion 13. One advantage, however, of locating the pump in the measuring chamber 12 at the inlet 22 of tube 21 is that the pump has less tendency to lime, etc., where the temperature of the water handled thereby is low. Further, the location of the pump in the upper measuring chamber provides improved accessibility thereto such as for maintenance purposes.

The tank 11 may be formed of a suitable rigid material, such as a plastic or metal. The transverse wall 15 may be sealingly secured to the cylindrical wall 14 by conventional means. Alternatively, the wall 15 may be formed integrally with the wall 14 as by dividing the cylindrical wall 14 at the level of the transverse wall 15. The lower portion of the cylindrical wall may be sealingly joined to the integrally formed upper portion and transverse wall 15 in the manner of a double-boiler. The wall 15 may be thermally conductive to transfer heat from the water in chamber 13 to the cold water in chamber 12 and thereby preheat the cold water for expedited elevation of the temperature thereof to the preselected brewing temperature when delivered to chamber 13.

Referring now to FIGURE 2, a modified form of the invention is shown to comprise a hot water supply apparatus, generally designated 110, which is generally similar to hot water supply apparatus 10 except that a gravity discharge apparatus 128 is provided in lieu of the pump 28 of apparatus 10. More specifically, the gravity discharge apparatus comprises an outlet duct 130 controlled by a conventional solenoid valve 130a. The duct, as shown in dotted lines in FIGURE 2, extends upwardly into the chamber 113 to substantially above the level of the heater 125 so that cold water entering into the bottom portion of chamber 113 through the duct 121 displaces the hot water at the bottom of the tank and causes the hot water to pass from the chamber 113 downwardly through the duct 130. The solenoid 130b of valve 130a may be connected in the electrical circuit in place of the motor 31 of apparatus 10 to open the valve 130a when discharge of hot water is desired. In all other respects apparatus 110 is similar to, and functions similarly to, apparatus 10.

While I have shown and described certain embodiments of my invention, it is to be understood that it is capable of many modifications. Changes, therefore, in the construction and arrangement may be made without departing from the spirit and scope of the invention as defined in the appended claims.

I claim:
1. Apparatus for providing a preselected quantity of hot brewing liquid comprising:
   means defining a first chamber;
   means defining a second chamber;
   passage means communicating with said chambers for conducting liquid seriatim to said first and second chambers;
   means for heating liquid in one of said chambers;
   means for sensing the level of liquid in the other of said chambers; and
   means for effecting a delivery of liquid from said second chamber, said delivery effecting means including control means responsive to the level sensing means
      (a) to terminate the delivery of the liquid from from the second chamber when the liquid level sensed by said sensing means reaches a preselected low level and substantially concurrently initiate a delivery of liquid through said passage means into said first chamber, and
      (b) to terminate the delivery of liquid to said first chamber when the level sensed by said sensing means reaches a preselected high level.

2. Apparatus for providing a preselected quantity of hot brewing liquid comprising:
means defining a measuring chamber;
means defining a heating chamber;
means for delivering cold brewing liquid to said measuring chamber;
means for transferring liquid from said heating chamber to a preselected discharge point and concurrently transferring cold liquid from said measuring chamber to said heating chamber;
means for heating liquid in said heating chamber;
means for selectively initiating operation of the transferring means;
means responsive to the level of the liquid in said measuring chamber for terminating operation of the transferring means when a preselected quantity of liquid has been transferred by said transferring means and subsequently causing said third named means to deliver a quantity of cold brewing liquid to said measuring chamber equal to that transferred.

3. Apparatus for providing a preselected quantity of hot brewing liquid comprising:
means defining a measuring chamber;
means defining a heating chamber;
means for delivering cold brewing liquid to said measuring chamber;
means for transferring liquid from said heating chamber to a preselected discharge point and concurrently transferring cold liquid from said measuring chamber to said heating chamber to maintain said heating chamber full at all times;
means for heating liquid in said heating chamber;
means for selectively initiating operation of the transferring means;
means for terminating operation of the transferring means as a result of the level of cold liquid in said measuring chamber reaching a preselected low level;
means for causing said third named means to commence delivery of cold brewing liquid to said measuring chamber upon the lowering of the level of liquid therein to said preselected low level;
and means for causing said third named means to terminate delivery of cold liquid to said measuring chamber when the level of cold liquid therein reaches a preselected upper level.

4. The apparatus of claim 3 wherein said transferring means comprises a pump means.

5. The apparatus of claim 3 wherein the heat transfer rate of the heating means is preselected to raise the temperature of the liquid transferred to said heating chamber to a preselected high temperature during a time interval equal to the total time of flow of liquid from the heating chamber and flow of liquid to the measuring chamber.

6. Apparatus for providing a preselected quantity of hot brewing liquid comprising:
means defining a measuring chamber;
means defining a heating chamber;
means for delivering cold brewing liquid to said measuring chamber;
means including a pump for pumping liquid from said heating chamber to a preselected discharge point and concurrently causing transfer of cold liquid from said measuring chamber to said heating chamber to maintain said heating chamber full at all times;
means for heating liquid in said heating chamber;
means for selectively initiating operation of the pump means;
means for terminating operation of the pump means as a result of the level of cold liquid in said measuring chamber reaching a preselected low level;
means for causing said third named means to commence delivery of cold brewing liquid to said measuring chamber upon the lowering of the level of liquid therein to said preselected low level;
and means for causing said third named means to terminate delivery of cold liquid to said measuring chamber when the level of cold liquid therein reaches a preselected upper level.

7. The apparatus of claim 6 wherein said pump is provided with an inlet communicating with the top portion of said heating chamber.

8. The apparatus of claim 6 wherein the pump is provided with an inlet communicating with the measuring chamber and an outlet communicating with the heating chamber.

9. Apparatus for providing a preselected quantity of hot brewing liquid comprising:
means defining a first chamber;
means defining a second chamber;
means for delivering cold brewing liquid to said first chamber, said delivering means including a flow control valve;
means including a pump for pumping liquid from said second chamber to a preselected discharge point and causing transfer of cold liquid from said first chamber to said second chamber;
means for heating liquid in said second chamber;
means for selectively initiating operation of the pump means;
means for terminating operation of the pump means as a result of the level of cold liquid in said first chamber reaching a preselected low level;
means for opening said valve to effect delivery of cold brewing liquid to said first chamber upon the lowering of the level of liquid therein to said preselected low level; and
means for causing said valve to terminate delivery of cold liquid to said first chamber when the level of cold liquid therein reaches a preselected upper level.

10. Apparatus for providing a preselected quantity of hot brewing liquid comprising:
means defining a measuring chamber;
means defining a heating chamber having a normally open outlet;
means for delivering cold brewing liquid to said measuring chamber;
means for transferring liquid from said heating chamber to a preselected discharge point and concurrently transferring cold liquid from said measuring chamber to said heating chamber to maintain said heating chamber full at all times, said transferring means including means defining a passage between said measuring and heating chambers, and means responsive to the level of liquid in said measuring chamber for limiting the quantity of hot liquid passed from the heating chamber through said outlet.

11. The apparatus of claim 10 wherein said flow controlling means comprises a solenoid valve normally closing the passage means extending downwardly from the heating chamber.

References Cited by the Examiner
UNITED STATES PATENTS

| | | | |
|---|---|---|---|
| 2,643,322 | 6/1953 | Lime et al. | 219—314 |
| 2,739,608 | 3/1956 | Brower | 137—391 |
| 2,792,912 | 5/1957 | Kangas | 137—391 X |
| 2,856,841 | 10/1958 | Cretors et al. | 137—341 |

M. CARY NELSON, *Primary Examiner.*

H. KLINKSIEK, *Assistant Examiner.*